(No Model.) 4 Sheets—Sheet 1.

F. RHIND.
SUSPENSION DEVICE FOR LAMPS.

No. 389,409. Patented Sept. 11, 1888.

Witnesses.
J. H. Shumway
Fred C. Earle

Frank Rhind
Inventor
By atty.
Wm. C. Earle (No Model.) 4 Sheets—Sheet 2.

F. RHIND.
SUSPENSION DEVICE FOR LAMPS.

No. 389,409. Patented Sept. 11, 1888.

Witnesses
J. N. Shumway
Fred C. Earl

Frank Rhind, Inventor
By atty (No Model.) 4 Sheets—Sheet 3.
F. RHIND.
SUSPENSION DEVICE FOR LAMPS.

No. 389,409. Patented Sept. 11, 1888.

(No Model.) 4 Sheets—Sheet 4.

F. RHIND.
SUSPENSION DEVICE FOR LAMPS.

No. 389,409. Patented Sept. 11, 1888.

United States Patent Office.

FRANK RHIND, OF MERIDEN, CONNECTICUT, ASSIGNOR OF ONE-HALF TO EDWARD MILLER & COMPANY, OF SAME PLACE.

SUSPENSION DEVICE FOR LAMPS.

SPECIFICATION forming part of Letters Patent No. 389,409, dated September 11, 1888.

Application filed March 26, 1888. Serial No. 268,527. (No model.)

*To all whom it may concern:*

Be it known that I, FRANK RHIND, of Meriden, in the county of New Haven and State of Connecticut, have invented a new Improvement in Suspension Devices for Lamps; and I do hereby declare the following, when taken in connection with accompanying drawings and the letters of reference marked thereon, to be a full, clear, and exact description of the same, and which said drawings constitute part of this specification, and represent, in—

Figure 1:
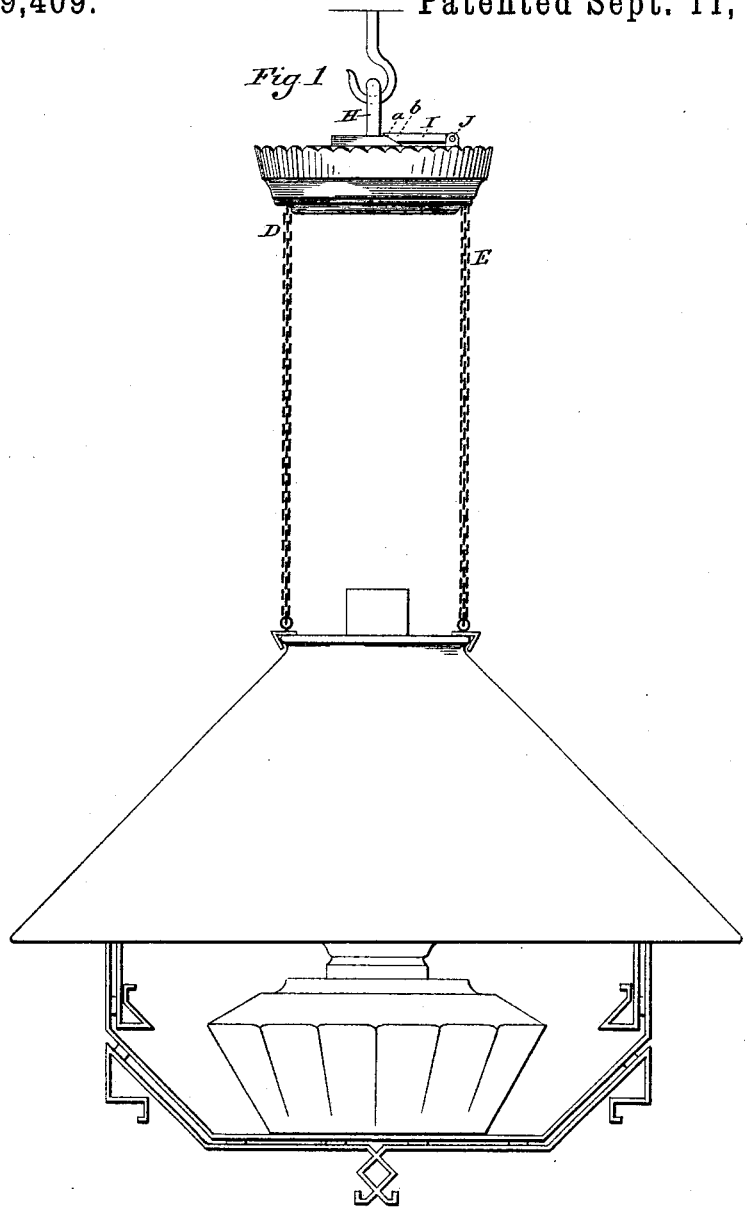
Figure 2:
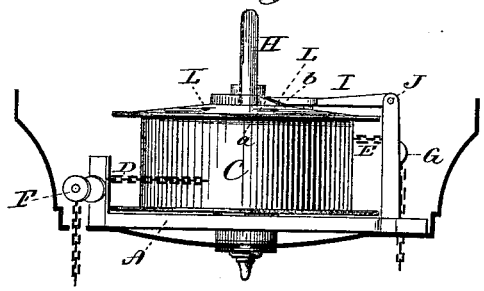
Figure 3:
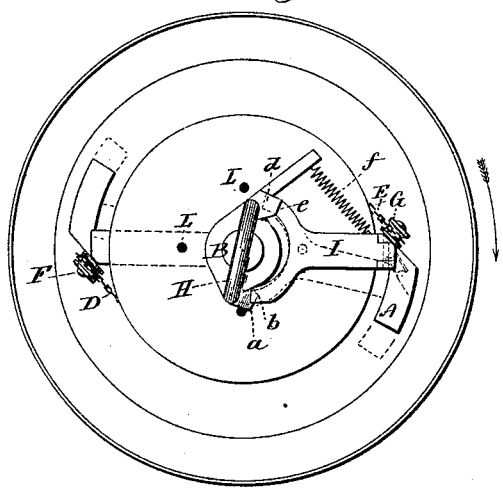
Figure 4:
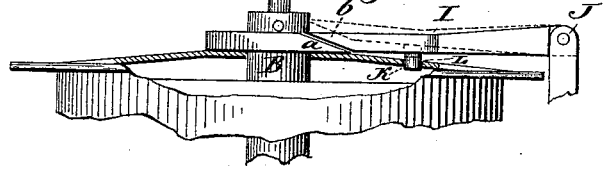
Figure 5:
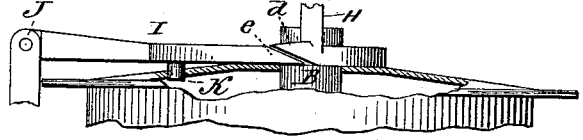

Figure 1, a side view of the whole fixture as suspended from the ceiling; Fig. 2, a side view of the lifting device, showing the chains as passing over the supports on the frame and extending downward; Fig. 3, a top view of the same; Fig. 4, a partial sectional side view, full size, looking toward the side on which is the cam *a* on the hanger and projection *b* on the dog; Fig. 5, a like side view looking from the opposite side; Figs. 6, 7, 8, 9, 10, 11, 12, 13, and 14, modifications.

This invention relates to an improvement in that class of fixtures which are designed to carry lamps, and in which the fixture is suspended from the ceiling of the apartment, with a provision in the fixture which will permit the lamp to be drawn downward from the ceiling and so that it may stand at different elevations; and it relates particularly to the class of fixtures in which the lamp is supported in a harp, and the harp suspended by chains from a spring-actuated drum above, and so that as the harp is drawn downward to bring the lamp to a lower elevation the chains operate upon the drum to impart rotation to it and thereby wind the spring of the drum, and so that the reaction of the spring will aid in raising the harp and will rewind the chains upon the drum, these lamps being generally known to the trade as "library-lamps" or "hanging lamps."

The weight of the adjustable part of the fixture varies to a considerable extent. This variation is due—

First, to the consumption of the oil in the fount. The requirements of the trade at the present time demand large burners, which are rapid consumers of oil, necessitating correspondingly large founts, and as the oil is consumed the weight of the lamp is correspondingly reduced.

Second, the founts are variable in weight. In some cases they are made of glass or porcelain, and in others of sheet metal. In the one case they are necessarily heavy and in the other case very much lighter. Again, the fount must ordinarily be removed for trimming, and to remove the fount it is necessary to draw the frame downward to a considerable extent. Then the removal of the fount greatly reduces the weight of the adjustable part of the fixture.

If the spring be adjusted so as to support the adjustable part in its elevated position—a position where the fount must in any case be permitted to stand—the drawing down of the adjustable part increases the lifting-power of the spring, and so that the tendency to lift the adjustable part of the fixture increases as the said adjustable part is drawn downward. From this it follows that if the power of the spring be sufficient to support the adjustable part in its highest position the increasing power of the spring as the adjustable part is pulled downward will give to the spring a power which will raise the adjustable part, (if no provision be made to the contrary,) and so that the adjustable part could not rest at any point substantially below its highest position, but would, on the contrary, rise under the reactive power of the spring.

To obviate the difficulties which I have mentioned, frictional devices have been applied to the spring-actuated drum, which will offer a resistance to the reaction of the spring, and this friction is designed to counteract the greatest amount of variation in the weight of the lamp or adjustable part of the fixture. In some cases this friction has been constant, so that the spring simply aids in raising the adjustable part. In other cases connection has been made with the frictional device in the drum, extending downward within reach, so that the friction could be removed when adjusting the lamp, but so that upon releasing the frictional device it will automatically engage the drum. In other cases a positive locking device has been employed, which would positively hold the drum at various points of rest.

This locking device, like the friction device before referred to, necessitates a connection therefrom to a point below, within convenient reach of the person adjusting the lamp.

The frictional devices before referred to are uncertain in their action, and, as the friction must be equal to the maximum variation in the weight of the adjustable part, it follows that in cases of light founts, or light-supporting harp for the fount, the frictional device is very much greater than necessary, and in the case of a connection extending from the frictional device, or from the locking device downward, the adjustment of the lamp is complicated, and usually necessitates the use of both hands.

The object of my invention is to produce a mechanism, in combination with the lamp-supporting frame, its suspending-chains, the drum upon which the chains are wound, and the frame which supports the drum, which may produce substantially a lock between the frame and the drum, but which lock may be disengaged by a rotative movement of the lamp communicated to the frame through the suspending-chains, and which object is well accomplished in the apparatus shown in the accompanying illustrations, and hereinafter described.

A represents the frame, which carries a vertical spindle, B. Upon this spindle the spring-actuated drum C is arranged, and so that it may revolve upon the spindle B as its axis, the spindle extends through the drum and, as represented, is vertical, so that the drum revolves in a horizontal plane. The drum is provided with a coiled spring upon its inside, one end of which is made fast to the drum and the other to the spindle, in the usual manner for the arrangement of spring-drums in lifting devices, too well known to require particular illustration or description, and so that as the drum is revolved in one direction it will wind the spring. Then the reaction of the spring will revolve the drum in the opposite direction.

Upon the drum two chains, D E, are arranged, one running to one side over a pulley, F, and downward, the other running to the opposite side and over a pulley, G, and downward, so that the chains may run in a plane substantially parallel with the axis of the drum. This is also a common arrangement of chains. To the chains the harp for supporting the lamp-fount is suspended, as represented in Fig. 1, also in the usual manner.

To the upper end of the spindle B a hanger, H, is concentrically pivoted, and so that the spindle may be rotated in the hanger, the hanger being secured to the ceiling, so that no substantial rotation can be imparted to it and so that when the hanger is so secured if the harp and lamp—that is, the adjustable part below—be rotated the rotation will be communicated through the chains to the frame and impart a corresponding rotation to the frame. To take advantage of this rotative movement of the frame while the hanger remains stationary and thereby interlock the drum with the frame, so that its rotation independent of the frame will be prevented, or release it from such interlocking, as occasion may require, I hang a dog, I, to the frame at one side of the drum—say as at J, Fig. 2—and so that the dog may swing in a vertical plane. The dog extends inward over the drum and is provided with a nose, K, (see Fig. 4,) which is adapted to engage one of a series of notches or cavities, L, in the head of the drum, which notches are in a circular path corresponding to the position of the said stud, and so that when the nose of the dog is engaged with one of said notches L, as represented in Fig. 4, the revolution of the drum independent of the frame will be prevented; but when the dog is raised, so as to disengage the drum, as represented in broken lines, Fig. 4, then the drum is free to revolve in either direction, according as the power is applied. Normally this dog lies in engagement with the drum, as represented in Figs. 2 and 4, so that at all times the drum is locked with the frame.

To disengage the dog from the drum by a partial rotation of the adjustable part below, which is communicated to the frame through the chains, I construct the hanger with a cam, $a$, at one side, which, it will be understood, is stationary with the hanger, and project the dog to a point, $b$, over this cam $a$. The cam and projection of the dog are one or both inclined, so that the projection from the dog may ride upon the upper surface of the cam, and so that if the adjustable part below be rotated in the direction of the arrow (see Fig. 3) the frame will be correspondingly rotated—say as indicated in broken lines in said Fig. 3—which will cause the projection $b$ from the dog to ride onto the cam $a$, and thereby raise the dog until the drum is free, as indicated in broken lines, Fig. 4. Then the adjustable portion may be pulled down or permitted to rise, the drum being now free from engagement with the frame. Then, when the desired elevation is attained, the adjustable portion may be turned in the opposite direction, which will withdraw the dog from the cam and permit it to drop to engage the notch of the drum which may next come into engagement with the nose of the dog. To force the dog into such engagement, a similar cam, $d$, is formed on the opposite side of the hanger in a position above a like projection, $e$, from the dog on that side, and as seen in Figs. 3 and 5, and so that as the frame is returned this projection $e$ of the dog will pass beneath the cam $d$ on the hanger, and the dog will thereby be forced downward and into engagement with the drum. Under this arrangement the drum is positively locked against rotation in either direction, and it is disengaged from such lock by imparting a rotation to the harp or adjustable portion below, which rotation is communicated through the flexible chains to the frame above.

A spring may be applied to return the frame to produce the relocking of the drum with the frame, say, as represented in Fig. 3, $f$ representing the spring between the stationary hanger and the frame, the tendency of which is to rotate the frame, so as to take the projection $b$ of the dog from the cam $a$ of the hanger; but this spring is not essential, as this return rotation of the frame independent of the drum may be effected by a return rotation of the harp or adjustable part below.

Figure 6:
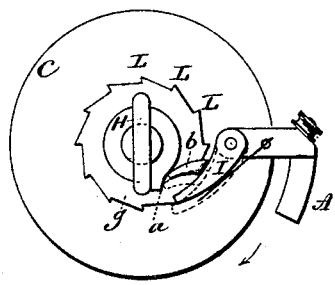

The illustration which I have made of the dog as a means of engaging the drum will be sufficient to enable those skilled in the art to apply different constructions of dog, which will accomplish the same purpose in substantially the same way; but to illustrate means for engaging the drum, which I wish to be understood as indicating equivalents for the dog which I have thus far described, I represents in Fig. 6 a simple pawl and ratchet, the toothed ratchet $g$ being made fast to the drum and concentric therewith, so as to produce teeth or notches L, which correspond to the notches L first described, and the dog I hung to the frame, but so as to swing in a horizontal plane instead of vertically, as first described. Then from the dog a projection, $b$, corresponding to the projection $b$ in the first illustration, extends to a cam or stop, $a$, fixed to the hanger, and which corresponds to the cam $a$ in the first illustration, and so that as the rotation is imparted to the frame through the chains, as before described, the projection $b$ from the dog will strike the cam $a$ on the hanger and will throw the dog out of engagement with the drum, as indicated in broken lines, Fig. 6, and thereby leave the drum free to rotate.

Figure 7:
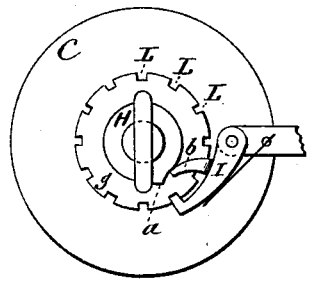
Figure 8:
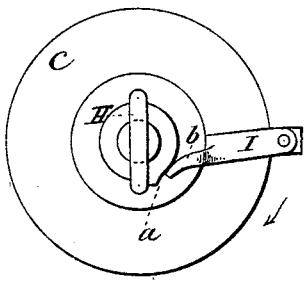

The teeth of the ratchet may be as represented in Fig. 6, so that the dog will escape therefrom when drawing the adjustable part downward, but will act as a positive stop against the rise of the adjustable part until the rotation of the frame, before referred to; or the notches L in the periphery of the ratchet and the nose of the dog may be such as seen in Fig. 7, so as to make a positive engagement in both directions, the dog to be thrown out by a reverse rotation of the drum, a spring being provided to yieldingly hold the dog in engagement with the ratchet; or the interlocking of drum and frame may be by a well-known substitute for the pawl and ratchet, as represented in Fig. 8, in which the dog engages the drum by frictional contact, from which it is disengaged by means of the projection $b$, extending from the dog to the fixed cam on the hanger.

Figure 10:
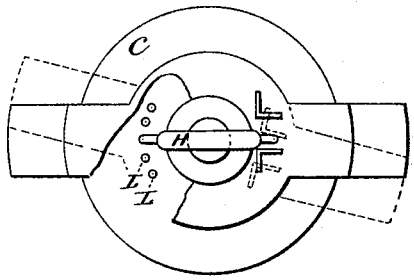
Figure 9:
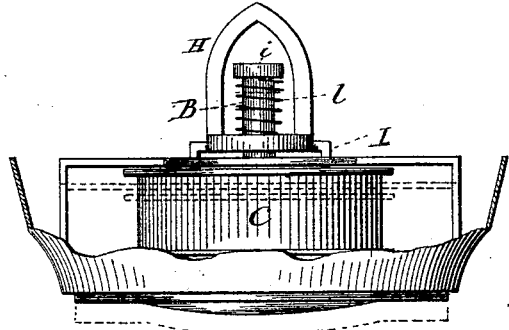
Figure 11:
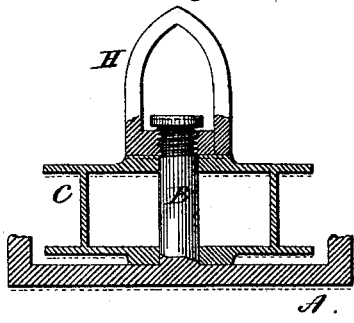

Instead of making the engagement between the frame and drum by means of a dog hung upon the frame, and, as thus far described, the dog may be made as substantially a part of the hanger, as represented in Figs. 9 and 10. In this case the hanger H is attached to the ceiling, so as to remain stationary or non-rotatable, and the spindle B extends up through the base of the hanger, and is constructed with a head, $i$, above, between which and the base of the hanger a spring, $l$, is applied, the power of which is sufficient to support the frame and all it carries, but so as to yield under a downward pull and so that the frame may be drawn down from the hanger, as indicated in broken lines, Fig. 9. The dog I in this case, instead of being hung to the frame, is a projection from the hanger through an opening in the top of the frame onto the upper surface of the drum, and that upper surface of the drum is provided with a series of notches, as in the first illustration, and as seen in Fig. 10, into either of which the nose of the dog is adapted to enter when the frame is in its up position, and so that the frame and drum will be then interlocked to prevent the rotation of one independent of the other; but when a pull-down is made upon the harp the first action is to draw the frame downward so far as to take the dog out of engagement with the drum and bring the dog above the frame, as represented in broken lines, Fig. 9. Then, as the harp is rotated, the chains which are supported on the frame impart that rotation to the frame, as indicated in broken lines, Fig. 10, so as to bring the dog onto the upper surface of the frame at one side of the dog-opening in the frame. Then, while the dog is in this unlocked position, the lamp may be adjusted to the desired elevation, and when that point is attained the harp is rotated in the opposite direction, and through its chains imparts corresponding rotation to the frame and brings the dog again over the opening of the frame. Then the spring $l$ reacts and draws the frame with the drum upward, so that the dog passes through the opening in the frame into the notch in the drum, and thereby engages the drum and frame, so as to prevent rotation under any weight or variation of weight which may be applied; or the engagement between the frame and drum may be of a clamping character, as represented in Fig. 11, in which the drum is supported upon the spindle B of the frame, as in the first illustration, and the spindle is supported in the stationary hanger, so as to permit rotation of the frame, as in that illustration; but the spindle is screw-threaded through the base of the hanger, so that a rotation of the frame will cause the frame to rise or fall, according to the direction in which the frame is rotated.

Figure 12:
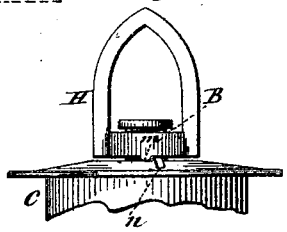

The under face of the hanger and the upper face or hub of the drum present corresponding surfaces, and so that as the frame is turned by means of the harp and chains, as before described, to force its spindle upward into the hanger it will bring the said surface of the drum into forced contact with the under surface of the hanger, and so as to clamp the hanger upon the frame below, as clearly seen in Fig. 11, and this forced engagement of the frame and drum will prevent the rotation of the drum until the frame shall have been returned, so as to release the clamp upon the drum, and as indicated in broken lines, Fig. 11; or, instead of making the interlocking between the frame and drum by frictional contact of the hanger brought to bear upon the drum by the frame, as in the last illustration, the hanger may be constructed, as seen in Fig. 12, with a projection or rib, *m*, upon its under face, and the corresponding surface of the drum constructed with corresponding projection or rib, *n*, so that as the frame is rotated, as before described, in one direction the unscrewing of the spindle from the hanger will bring the drum so far below the hanger that the projection on the drum will escape that on the hanger, and then when the frame with the drum is rotated in the opposite direction the screw-spindle of the frame will draw it upward and so as to bring the projections of the hanger and drum into engagement, and thereby prevent the possible rotation of the drum.

Figure 13:
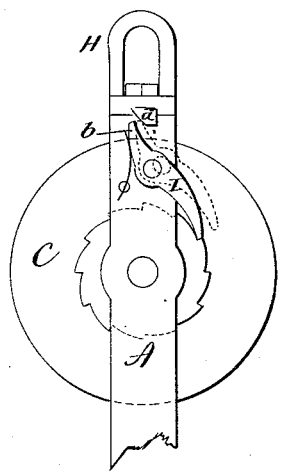
Figure 14:
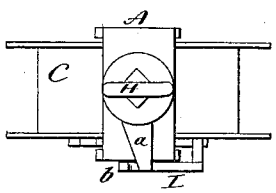

I have represented the drum as arranged upon a vertical axis and so as to revolve in a horizontal plane, the chains running therefrom over supports at opposite points in the frame, and this is the best arrangement of drum for lamps which are suspended by chains; but in some cases the drum is arranged upon a horizontal axis and so as to revolve in a vertical plane, as represented in Figs. 13 and 14. In this case the frame is pivoted directly to the hanger at its one end instead of through the drum-spindle, as in the first illustration. In this case the engaging device may be the same— say the pawl and ratchet of Fig. 6 and as represented in Fig. 13—and from the pawl there is an extension, *b*, as before, which under the rotation of the frame engages a cam, *a*, on the hanger, so as to throw the dog out of engagement with the drum, as represented in broken lines, Fig. 13.

These illustrations will be sufficient to indicate that my invention is not to be understood as limited to any specific mechanism between the fixed hanger, the rotating frame, and the drum, whereby the drum may be substantially interlocked with the frame under a rotation of the frame produced by the harp below through the suspending-chains which are supported by the frame, or the drum disengaged from the frame by a like rotation in the opposite direction. In any case the harp or lamp support below through the chains which connect it with the frame is the means by which the rotation of the frame is produced.

It will be understood by the term "chains" that any of the known flexible devices—such as cords, wires, &c.—are included.

In another application, Serial No. 256,511, filed November 30, 1887, I have illustrated and described extension-fixtures for illuminating purposes, in which the drum is interlocked, so as to prevent its rotation, and in which the drum is disengaged by a rotative movement imparted to the fixture below. I therefore in this application do not wish to be understood as claiming, broadly, such a fixture, my present invention being for the adaptation of the invention of that application to the class of lamps commonly known as "library-lamps."

I claim—

1. In a hanging-lamp fixture, the combination of a hanger adapted to be secured to the ceiling, and so as to prevent its rotation, a frame hung to said hanger upon an axis, and so as to rotate thereon, a spring-actuated drum arranged upon an axis in said frame, two or more chains wound upon said drum and running therefrom at opposite sides over supports in the frame, a lamp-support below hung to the free ends of said chains, the said frame adapted to receive a rotative movement upon its axis from the lamp-support through the chains, and mechanism, substantially such as described, between the fixed hanger, the rotating frame, and drum adapted to interlock the frame and drum, substantially as specified, and whereby, under the rotation of the said frame in one direction, imparted thereto from the lamp-support below through the chains, the said drum and frame are disengaged to permit the rotation of the drum independent of the frame, or by the rotation of the frame in the opposite direction the frame and drum are interlocked.

2. In a hanging-lamp fixture, the combination of a hanger adapted to be secured to the ceiling, and so as to prevent its rotation, a frame hung to said hanger upon an axis, and so as to rotate thereon, a spring-actuated drum arranged upon an axis in said frame, two or more chains wound upon said drum and running therefrom at opposite sides over supports in the frame, a lamp-support below hung to the free ends of said chains, the said frame adapted to receive a rotative movement upon its axis from the lamp-support through the chains, a dog between said frame and drum arranged to interlock the one with the other, and mechanism between the hanger and frame, substantially such as described, whereby, under the rotation of the said frame, imparted thereto from the lamp-support below through the chains, the said dog is thrown out of its engaging position to permit the rotation of the drum independent of the frame.

3. In a hanging-lamp fixture, the combination of the hanger adapted to be secured to the ceiling, and so as to prevent its rotation, a frame pivoted upon said hanger, and so as to rotate thereon, a spring-actuated drum arranged upon an axis in said frame, two or more chains wound upon said drum and running therefrom at opposite sides over supports in the frame, a lamp-support below hung to the free ends of said chains, a dog hung to the frame and adapted to engage the said drum, so as to prevent the reaction of the drum-spring, a projection from said dog, and a corresponding cam stationary upon said hanger, with which cam the said projection from the dog is adapted to engage under a rotation of the said frame from the lamp-support below, and so as to disengage the drum from the frame, substantially as described.

FRANK RHIND.

Witnesses:
GEO. L. COOPER,
S. J. ROBY.